United States Patent [19]
Gendreau

[11] Patent Number: 5,817,265
[45] Date of Patent: *Oct. 6, 1998

[54] METHOD FOR PRECISION PREFORMING OF COMPLEX COMPOSITE ARTICLES

[75] Inventor: Johnny Paul Gendreau, Beacon Falls, Conn.

[73] Assignee: Dow-United Technologies Composite Products, Inc., Wallington, Conn.

[*] Notice: This patent issued on a continued prosecution application filed under 37 CFR 1.53(d), and is subject to the twenty year patent term provisions of 35 U.S.C. 154(a)(2).

[21] Appl. No.: 538,606

[22] Filed: Oct. 3, 1995

[51] Int. Cl.⁶ .............................. B29D 9/00; B29C 70/00; B28B 3/00; B28R 7/26
[52] U.S. Cl. ...................... 264/138; 264/152; 264/153; 264/154; 264/155; 264/156; 264/161; 264/163; 264/258; 156/221; 156/222; 156/224
[58] Field of Search .................... 264/138, 152, 264/153, 154, 155, 156, 161, 163, 258; 156/221, 222, 224

[56] References Cited

U.S. PATENT DOCUMENTS

| | | | |
|---|---|---|---|
| 1,118,315 | 11/1914 | Trist | 264/163 |
| 2,045,471 | 6/1936 | Kasen | 264/163 |
| 2,283,629 | 5/1942 | Heftler | 164/21 |
| 2,844,354 | 7/1958 | Warnken | 156/222 |
| 3,058,154 | 10/1962 | Howard et al. | 264/163 |
| 3,518,756 | 7/1970 | Bennett et al. | 29/625 |
| 3,597,800 | 8/1971 | Silverman | 264/292 |
| 3,651,191 | 3/1972 | Glatt et al. | 264/153 |
| 3,704,194 | 11/1972 | Harrier | 264/156 |
| 3,787,546 | 1/1974 | Pratt et al. | 264/156 |
| 4,013,750 | 3/1977 | Magidson et al. | 264/136 |
| 4,026,749 | 5/1977 | Appelhans et al. | |
| 4,285,754 | 8/1981 | DiMatteo | 264/152 |
| 4,824,507 | 4/1989 | D'Amico | 264/258 |
| 5,040,962 | 8/1991 | Wasceziak et al. | 264/163 |
| 5,066,442 | 11/1991 | Gutowski et al. | 264/154 |
| 5,196,152 | 3/1993 | Gamache et al. | 264/163 |
| 5,217,656 | 6/1993 | Buckley et al. | 264/258 |
| 5,252,165 | 10/1993 | Fecto et al. | |
| 5,268,055 | 12/1993 | Bales et al. | |

FOREIGN PATENT DOCUMENTS

| | | |
|---|---|---|
| 0 473 422 A1 | 3/1992 | European Pat. Off. . |
| 6155483 | 3/1994 | European Pat. Off. . |
| 1441362 | 1/1962 | Germany . |

OTHER PUBLICATIONS

Improvements and Further Developments in Fibre Glass Mat Preforming, by Christer Lidgard, vol. 5, No. 4, 1 Jan. 1992, pp. 270–281, XP000292831.

Kunststof en Rubber, No. 6, 1 Jun. 1992, pp. 23–26, XP000272373, Drogt B.A. et al: "S–RIM".

Kunststoffe, vol. 79, No. 7, Jul. 1989, pp. 586–589, XP000046454, Michaeli W. et al: Das Rtm–Verfahren—Technologie und Anwendungsgebiete.

Primary Examiner—Jan H. Silbaugh
Assistant Examiner—Robin S. Gray
Attorney, Agent, or Firm—Nims, Howes, Collison, Hansen & Lackert

[57] ABSTRACT

An apparatus and method provide for the assembly of a multiply shaped fiber preform, the apparatus using a shaping tool having the shape of the desired part, and one or more secondary location tools, can be positioned on the shaping tool, so as to simulate a flat shape. The location tools include a number of upwardly extending location pins, such that a number of plies can be assembled in a vertical stack using the pins to assure ply to ply accuracy and orientation. After assembly, the plies are engaged in a localized portion of the assembly so as to hold the plies in register, with the secondary tools then removed and the plies then formed to shape over the tool surfaces. Utilizing the apparatus and method of the invention maintains multiple plies in register during the assembly and forming process to assure part reproducibility, in an automated process.

8 Claims, 4 Drawing Sheets

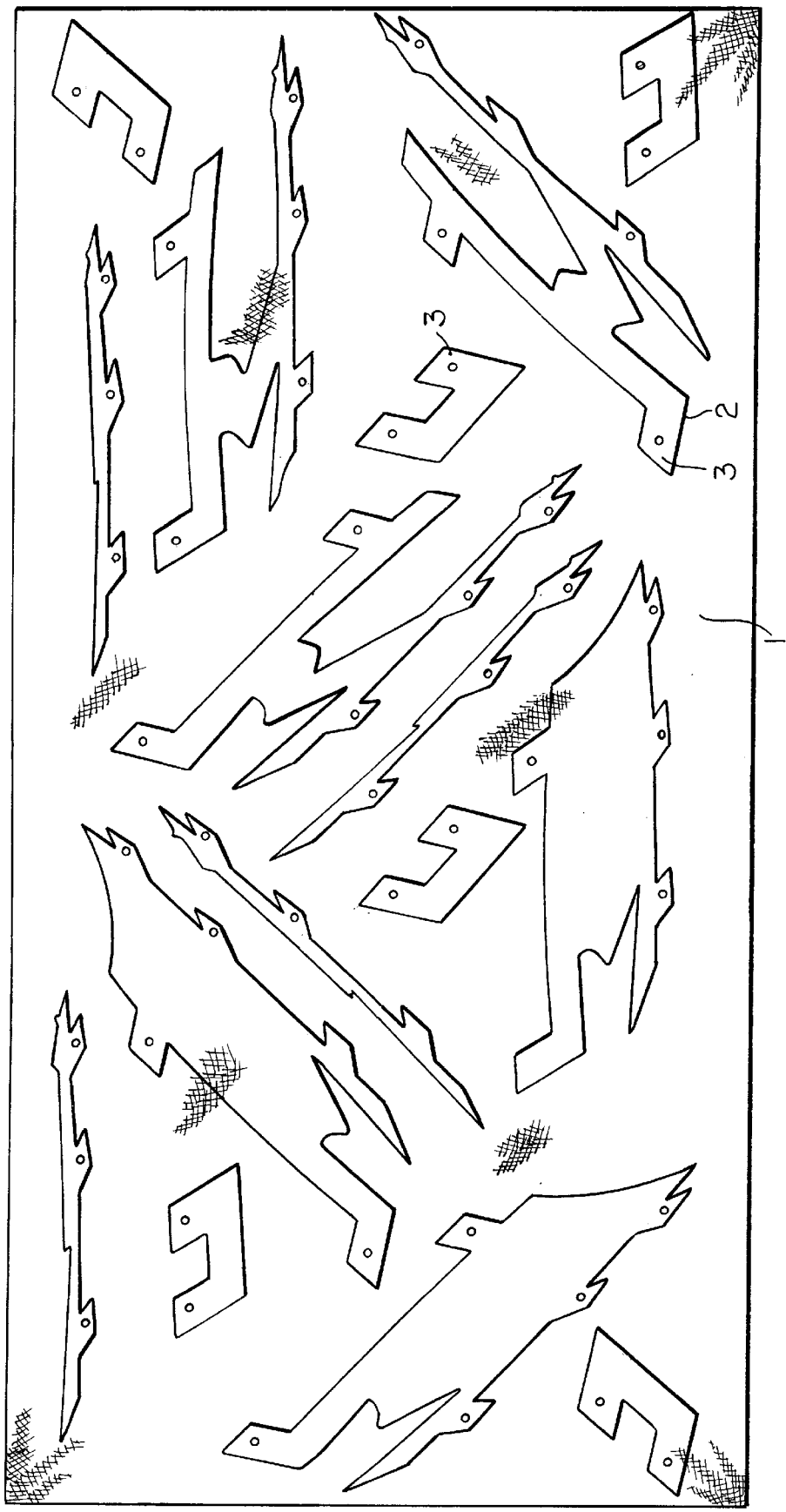
FIG. I

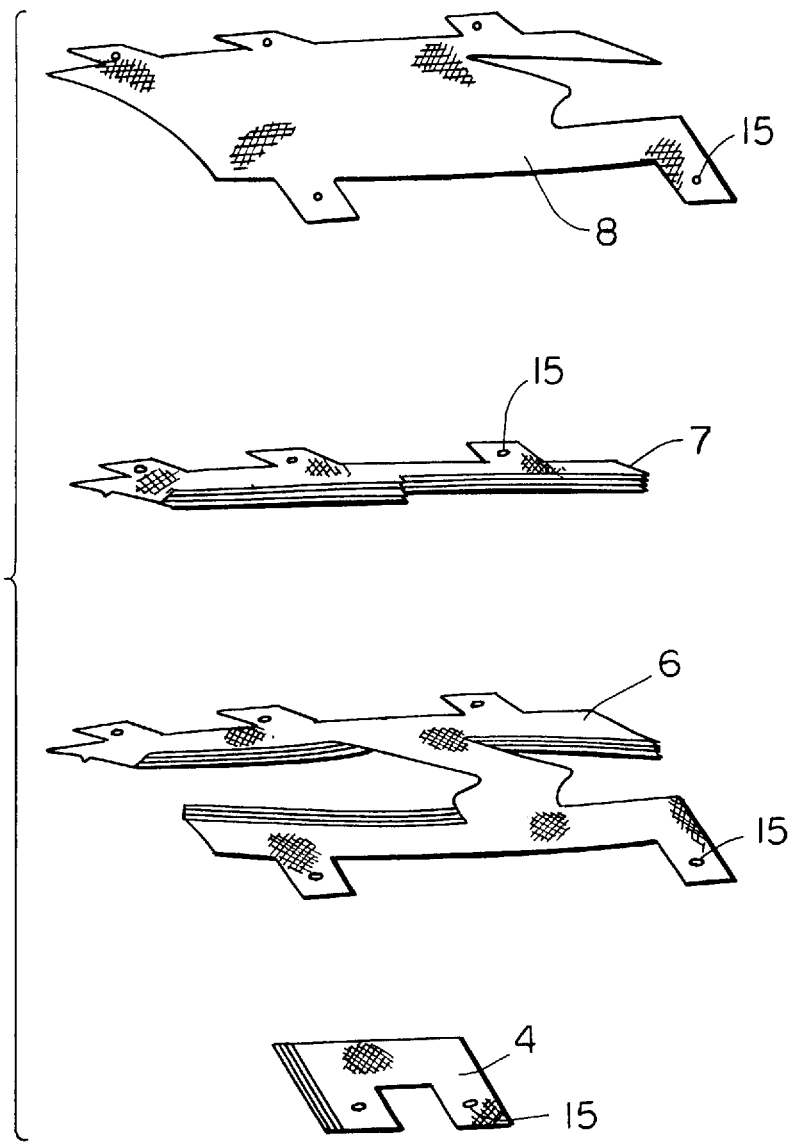
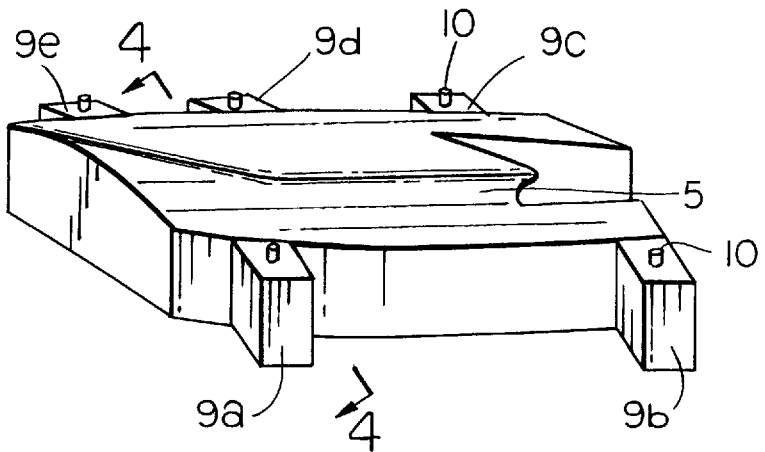

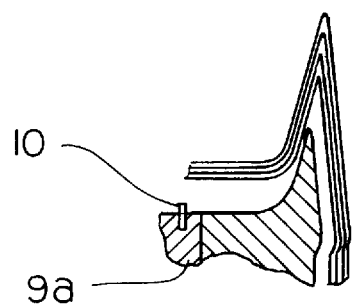
F I G. 4
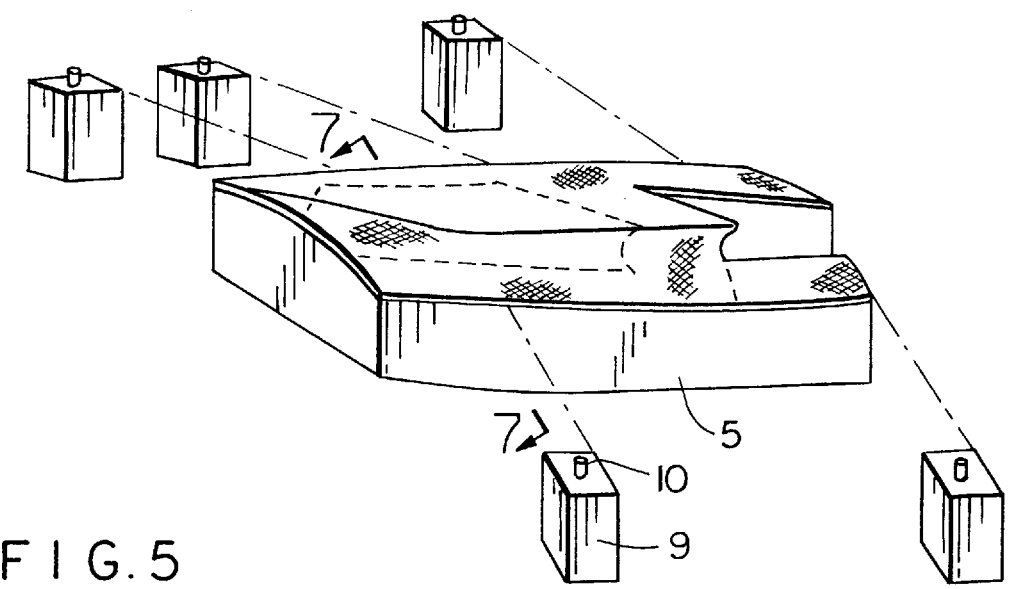
F I G. 5
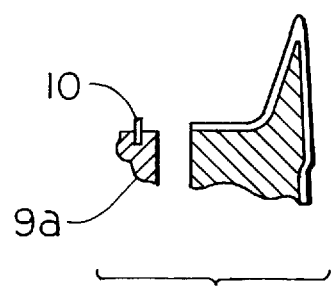
F I G. 7

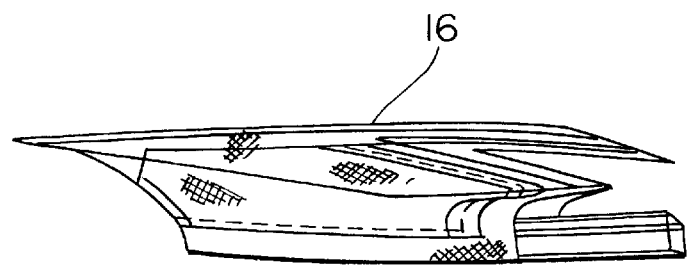
F I G. 6
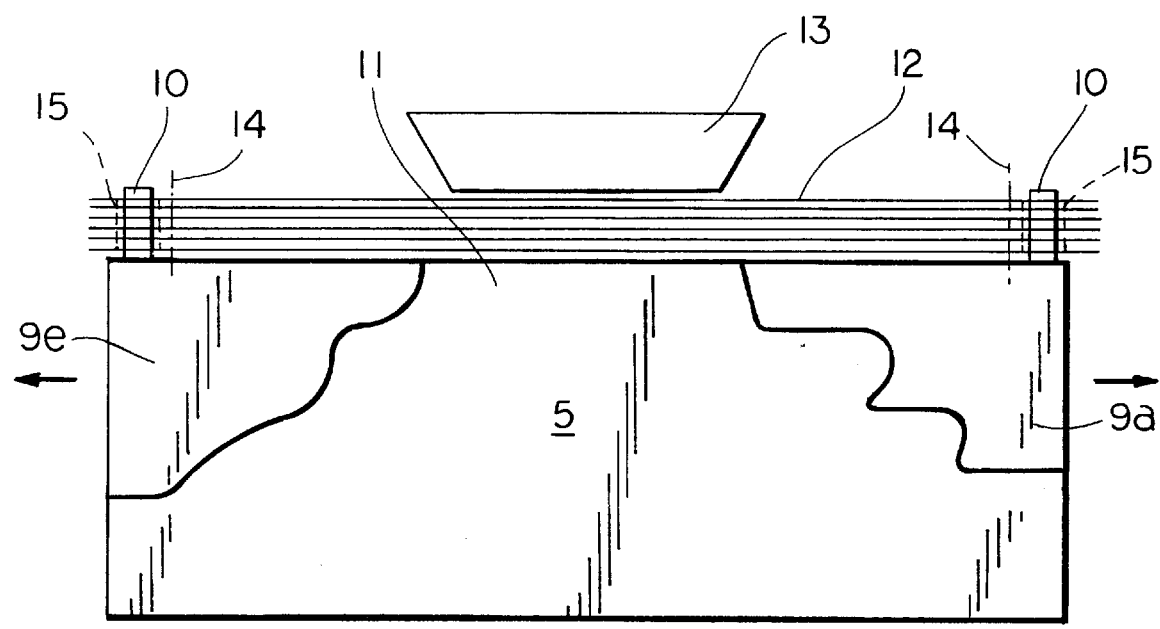
F I G. 8

METHOD FOR PRECISION PREFORMING OF COMPLEX COMPOSITE ARTICLES

TECHNICAL FIELD

This invention relates to methods for forming multilayer fiber preforms for producing complex composite articles in a resin transfer molding process.

BACKGROUND

In the fabrication of a composite article, it is typical to assemble a plurality of orientated dry fiber layers into a shape to match the shape of the article. This assembly of dry fiber layers is known as a "preform", which is typically subsequently placed into a mold. Resin is then injected into the mold to infiltrate between the fibers, to fill the voids between fibers and thus produce a composite part. This process for producing composite parts is known as "resin transfer molding" (RTM) process.

To produce the preform, a plurality of fiber plies are placed in a stack and shaped to the shape of the article. In assembling these plies into a stack, it is critical that the fiber orientation be located accurately with respect to the tool and therefore the finished part and then the fibers held in this orientation during the completion of the assembly and forming steps, as the structural properties of the final part depend on this fiber orientation.

Presently, locating the fiber layers and determining that the proper orientation is achieved, must be done manually, with a visual check after each layer has been added to the stack. However, the assembly process itself may cause some disorientation of lower layers, as adjustments are made to upper layers to place them in the correct orientation. Generally, to assure part to part consistency, it is necessary to maintain the accuracy between fibers in adjacent plies to within ±3 degrees. At present, it is very difficult to achieve such accuracy. In addition, increased complexity in part shape has made it much more difficult to maintain the orientation of the plies during the forming steps, because as the plies are conformed to various contours, they shift position. For example, parts having complex curvatures, projecting flanges, angular edges, or other complex structures, requires that the plies be freely movable relative to each other during the forming process yet this shaping must be done in a controlled manner to prevent fiber distortion. At present, it is difficult to produce such part preforms.

SUMMARY OF THE INVENTION

It is an object of the present invention to provide a method for placing a plurality of fiber plies in an assembled stack with precision, such that proper fiber orientation can be assured without measuring after each layer is placed on the stack.

It is another object to provide a method that can be automated, to significantly reduce the time and labor required to produce a fiber preform.

It is another object to provide tooling to facilitate the automated assembly of fiber plies in substantially flat form, prior to shaping, while assuring proper ply to ply fiber orientation.

These and other object of the present invention are achieved by a method for producing preforms for composite parts comprising the steps of providing a plurality of fiber plies, cutting one or more location holes in each ply in an area which will not be included in the part, the holes corresponding to a common location when all the plies are in proper vertical alignment, providing a shaped assembly tool having a shape to match the shape of the part, providing one or more secondary location tools to alter the shaping assembly tool to simulate a substantially flat surface, the secondary tools having one or more location pins extending therefrom, placing the plurality of plies sequentially over both the assembly tool and secondary tools to assemble the plies in a flat stack, the holes in the plies accommodating the location pins which extend therethrough, cutting the fiber plies adjacent the holes and locating pins, removing the secondary tools, pins and cut fibers, and, shaping the plies over the assembly tool into the part shape.

Utilizing location pins and auxiliary tooling allows a plurality of flat plies to be orientated and assembled into a stack with the pins assuring accuracy between each of the layers and holding them in position during the assembly process. The flat stack is easily assembled utilizing automatic equipment to avoid operator intervention. The hole locations in the plies are selected so as to assure proper ply to ply alignment, and these patterns may be computer generated. Typically the holes are provided in a selvage area which can easily be removed after the stack is assembled. Prior to cutting the fiber plies, a portion of the preform can be compressed to hold the plies in register, as the peripheral fabric, tools and pins are removed. Then, all the layers external to the area in compression are pressed against and into the shaping tool to produce the preform without significant fiber shifting. Where fabric distortion is allowed for, usually in an area away from the ply orientation rosette, this process insures a repeatable part configuration.

BRIEF DESCRIPTION OF THE DRAWINGS

FIG. 1 shows a sheet of fiber material, showing the outline of various plies which may be cut from the sheet.

FIG. 2 is an exploded view showing the plies in the order of assembly for placement on a shaping tool.

FIG. 3 is a shaping tool including four secondary tools for flat ply assembly.

FIG. 4 is a cross-section through the tools taken along line A—A of FIG. 3.

FIG. 5 shows the removal of the secondary tools.

FIG. 6 is an isometric view of the finished part.

FIG. 7 is a cross-section taken along line B—B of FIG. 5.

FIG. 8 is a cross-sectional view of the shaped assembly tool and secondary tool, with the plies thereon.

DETAILED DESCRIPTION OF THE INVENTION

Referring to FIG. 1, a sheet of fiber material 1 is shown. This sheet may comprise woven or non-woven fibers 2 in the form of a sheet. The sheet contains a number of outlines 2 which indicate cuts to be made in this sheet to produce a number of part plies. Various means may be used to cut the material into individual plies of the predetermined shapes and patterns. For example, a numerically controlled cutter movable in orthogenal directions over the sheet may be used, with the cutter directed by a computer. Plies may also be cut using temporary or permanent templates or pattern markers.

In determining the particular shapes of the individual plies, consideration is given to maximizing the number of plies cut from the fiber sheet so as to limit the amount of scrap, due to the expense of the material. This is particularly true with graphite fiber sheets. However, sufficient surplus is available to include selvage areas in the form of tabs 3, next to each ply, which are located so as to effect accurate assembly to a ply stack.

While tabs are shown for illustrative purposes, it is not necessary that such distinct tab shapes be used, and the rectangular tabs are shown here for illustrative purposes only. It is only necessary that some portion of the selvage area be designated to incorporate a location hole 15, with a hole then later cut in the designated area to facilitate ply assembly.

Typically, the individual part plies are determined by taking the ultimate part shape and "unwrapping" it from its three dimensional configuration, using commercially available computer software. Such software can therefore segment the part into the number of plies necessary and then flatten these out so as to generate a flat ply pattern.

At the time that the flat ply pattern is generated, the part outline can be modified to incorporate the ply alignment tabs or similarly designated areas, with the holes 15 chosen such that assembly of the oriented fiber plies can be facilitated. Once a flat pattern is determined, as shown in FIG. 1, the various plies are cut from the sheet material.

Referring to FIG. 2, the cut plies are shown as they are to be assembled. The plies 4 would be assembled into a sub-unit, and then placed on a forming tool 5, as shown in FIG. 3. Then, single plies or sub-units composed of a number of similarly shaped plies are assembled, such as sub-units 6, 7, and 8, and these are then placed on the tool in the appropriate sequence necessary for assembling the preform.

The tool 5 has a surface to match the ultimate part shape, but additionally includes a plurality of detachable location blocks, 9a, b, c, d, e with the incorporation of the location blocks providing portions for filling in the low areas of the tools to provide a flat surface on the tool to ease ply assembly. This is best shown in FIG. 8. These location blocks contain locating pins 10 which accommodate the location holes in the various plies. Thus, the assembly proceeds with assured accuracy in the ply to ply orientation. FIG. 3 shows the tool with the location blocks in place, with FIG. 4 showing a cross-section of the tool illustrating how the location blocks can allow flat ply assembly prior to the removal.

The design of the location blocks can be optimized by placing the blocks near a peak of the highest point of the part or near an area which will first be formed. This allows the plies to be stacked in a flat pattern, as shown in FIG. 8 and the highest point 11 of the assembled stack 12 clamped by a member 13 or otherwise engaged to hold all the plies together. Then, the selvage areas are cut along line 14 adjacent to the pins such that the location blocks can be removed. This exposes the complex surfaces of the tool, and allows the assembled plies to be pressed against and formed around these complexed shapes of the tool.

Of course, once clamped, the fibers maintain their ply to ply orientation, and only shift in the amount necessary for the plies to conform to the shape of the tool.

Referring to FIG. 5, the location blocks have been removed and the plies debulked and formed to the tool shape. FIG. 6 shows the completed part 16 after forming with FIG. 7 showing the cross-section of the tool with the plies formed to the shape of the tool.

One advantage of the present invention is that the location blocks can be used to support a flat layer of the plies, acting as a bridge over contour areas. The blocks are only removed after the plies have been stabilized by pressing or otherwise being held in place with the plies then easily shaped over the surfaces of the forming tool while maintaining essentially the ply to ply relationship required.

Another advantage of the invention is that it can be easily automated, since it is possible for a machine to cut, pick and place the various plies on to the shaping tool, with the locating pin and holes assuring that the plies have been assembled in the correct orientation. The clamping step, cutting and removal of the secondary tools, as well as the forming step, then proceeded in automatic fashion. Operator intervention while still required is greatly reduced. Of course, it may be desirable to incorporate various inspection techniques to assure proper assembly and orientation, but the method itself assures accuracy and such optional steps can be minimally intrusive and consume little time or labor.

This invention can be used with any fiber material such as graphite, aramid, glass etc. in any desired weave or fiber orientation. The fiber plies can be dry, that is, without any preimpregnating resin, so that the assembly can be used in a resin transfer molding process. Of course, any suitable resin, such as epoxy, bismaleimide, styrene, polyurethane, etc. can be used.

The tooling can also be of any conventional type, and typically is made of aluminum, though steel, invar and steel pins can be used. The number of holes and size of the holes can be selected and depend on the part configuration. Typically, the holes can be from ¼ inch to 1 inch in diameter depending, the part to be made and number of plies, etc. This is a matter of choice. There is no limit to the number of plies that can be assembled together using this tooling technique, and up to eighteen plies have been successfully assembled using this method.

While particular embodiments of the present invention have been shown and described, it will be understood by one skilled in the art that various changes or modifications can be made without varying from the scope of the present invention.

I claim:

1. A method for producing a shaped preform for forming a composite part comprising the steps of:
   providing a plurality of fiber plies,
   providing one or more location holes in each of the plurality of fiber plies in an area which will not be included in the shaped preform, the one or more location holes in each of the plurality of fiber plies corresponding to at least one common location,
   providing a shaping assembly tool having a contoured surface corresponding to a shape for forming the shaped preform,
   assembling one or more secondary location tools, each having a fiber ply support surface, with the shaping assembly tool such that the one or more secondary location tools cooperate with the contoured surface and provide a substantially flat plate, each of the one or more secondary location tools having one or more location pins extending therefrom,
   stacking the plurality of fiber plies sequentially over the substantially flat plate, including the shaping assembly tool and the one or more of the secondary location tools, to assemble the plurality of fiber plies in a substantially flat vertical stack, the substantially flat vertical stack bridging over the contoured surface of the shaping assembly tool, as the one or more location holes in the plurality of fiber plies accommodate the location pins which extend therethrough,
   cutting the substantially flat vertical stack of the plurality of fiber plies adjacent the one or more location holes and the location pins forming fiber ply fragments having the one or more location holes therein, removing the one or more secondary location tools, including the pins and the fiber ply fragments having the one or more location holes, to expose the contoured surface while maintaining proper fiber orientation, and shaping by pressing the substantially flat vertical stack of fiber plies against the contoured surface of the shaping assembly tool to form the shaped preform.

2. The method of claim 1, further comprising compressing a portion of the substantially flat vertical stack of the plurality of fiber plies to hold the plurality of fiber plies of the substantially flat vertical stack in register prior to the cutting of the substantially flat vertical stack of the plurality of fiber plies.

3. The method of claim 1 wherein the area not included in the shaped preform is in the form of a tab.

4. The method of claim 1 wherein the one or more secondary location tools have portions which fill in low areas of the shaping assembly tool.

5. The method of claim 2 wherein the portion compressed is a high point of the shaped preform.

6. The method of claim 1, wherein the step the stacking the plurality of fiber plies sequentially further comprises assembling one or more vertically stacked subunits of the plurality of fiber plies, each of the one or more vertically stacked subunits having at least one location hole of the one or more location holes therethrough, and placing the one or more vertically stacked subunits over the shaping assembly tool and at least one of the one or more of the secondary location tools, the at least one location hole of each of the one or more vertically stacked subunits accommodating the location pins which extend therethrough.

7. The method of claim 6, wherein at least one of the one or more vertically stacked subunits covers only a portion of the substantially flat plate.

8. The method of claim 1, wherein the step of providing a plurality of fiber plies comprises: using computer software to segment the composite part into a plurality of part plies to flatten said plurality of part plies, and to generate a flat ply pattern having outlines of the plurality of part plies, said computer software further being used to modify said outlines to incorporate part ply alignment tabs; providing a fiber sheet; and cutting said plurality of fiber plies having said modified outlines from said fiber sheet.

\* \* \* \* \*